(12) United States Patent
Amstibovitsky et al.

(10) Patent No.: US 8,696,253 B2
(45) Date of Patent: Apr. 15, 2014

(54) CUTTING TOOL AND SHAPED COOLANT OUTLET THEREFOR

(75) Inventors: Leonid Amstibovitsky, Haifa (IL); Grigori Neiman, Kiryat Ata (IL)

(73) Assignee: Iscar, Ltd., Tefen (IL)

( * ) Notice: Subject to any disclaimer, the term of this patent is extended or adjusted under 35 U.S.C. 154(b) by 260 days.

(21) Appl. No.: 13/149,477

(22) Filed: May 31, 2011

(65) Prior Publication Data

US 2011/0305531 A1      Dec. 15, 2011

(30) Foreign Application Priority Data

Jun. 10, 2010    (IL) .......................................... 206283

(51) Int. Cl.
    *B23Q 11/10*     (2006.01)
    *B23B 27/10*     (2006.01)

(52) U.S. Cl.
    USPC .............................................. 407/11; 408/61

(58) Field of Classification Search
    CPC .................. B23Q 11/10; B23B 27/10
    USPC .................... 407/11; 408/61, 57, 59
    See application file for complete search history.

(56) References Cited

U.S. PATENT DOCUMENTS

| | | | | |
|---|---|---|---|---|
| 2,405,298 A | * | 8/1946 | Fleischer ...................... | 76/108.6 |
| 2,653,517 A | * | 9/1953 | Pigott .......................... | 409/132 |
| 3,313,186 A | * | 4/1967 | Rochon ........................ | 76/108.1 |
| 3,606,560 A | * | 9/1971 | McClennan ................... | 408/59 |
| 4,621,547 A | * | 11/1986 | Yankoff ........................ | 82/1.11 |
| 5,775,854 A | | 7/1998 | Wertheim | |
| 6,045,300 A | * | 4/2000 | Antoun .......................... | 407/11 |
| 6,299,388 B1 | * | 10/2001 | Slabe ............................ | 407/11 |
| 2005/0244236 A1 | * | 11/2005 | Bosman ........................ | 408/59 |
| 2006/0039766 A1 | | 2/2006 | Hecht | |
| 2007/0283794 A1 | * | 12/2007 | Giannetti ..................... | 82/158 |
| 2008/0175678 A1 | | 7/2008 | Prichard et al. | |
| 2011/0020072 A1 | * | 1/2011 | Chen et al. ................... | 407/11 |
| 2011/0020075 A1 | | 1/2011 | Prichard et al. | |
| 2011/0020076 A1 | | 1/2011 | Prichard et al. | |
| 2011/0027021 A1 | * | 2/2011 | Nelson et al. ................. | 407/11 |
| 2011/0027022 A1 | | 2/2011 | Prichard et al. | |
| 2011/0033249 A1 | | 2/2011 | Prichard et al. | |

FOREIGN PATENT DOCUMENTS

| | | |
|---|---|---|
| EP | 1428601 A1 | 6/2004 |
| JP | 57189701 U | 12/1982 |
| WO | WO 2008/088627 | 7/2008 |

OTHER PUBLICATIONS

International Search Report dated Oct. 6, 2011 issued in counterpart PCT application (No. PCT/IL2011/000406).

\* cited by examiner

*Primary Examiner* — Daniel Howell
*Assistant Examiner* — Ryan Rufo
(74) *Attorney, Agent, or Firm* — Womble Carlyle

(57) ABSTRACT

A cutting tool (10, 36, 43) includes a coolant channel (22) having a coolant outlet (24) formed with an elongated shape, wherein a medial line (A) extending longitudinally along the coolant outlet (24) comprises a bend (60). The coolant outlet may be formed on a housing which is mounted on a tool body, or may be formed directly on the tool body itself.

17 Claims, 5 Drawing Sheets

CUTTING TOOL AND SHAPED COOLANT OUTLET THEREFOR

FIELD

The subject matter of the present application relates to cutting tools having shaped coolant outlets configured for delivering coolant to a cutting edge of a cutting element.

BACKGROUND

A method of cooling a cutting edge of a cutting element is dispensing concentrated high pressured coolant thereon. Such coolant can be dispensed via coolant channels formed with shaped coolant outlets.

U.S. Pat. Nos. 6,045,300 and 5,775,854 disclose shaped coolant outlets.

SUMMARY

In accordance with a first aspect of the subject matter of the present application, there is provided a cutting tool comprising a coolant channel having a coolant outlet formed with an elongated shape, wherein a medial line extending longitudinally along the coolant outlet comprises a bend.

It will be appreciated that the coolant outlet can be formed on any appropriate part of the cutting tool.

To elaborate, the cutting tool can comprise a cutting tool body formed with the coolant outlet.

Alternatively, the cutting tool body can comprise a coolant dispensing housing mounted thereon. In such case the coolant dispensing housing can comprise an outlet end formed with the coolant outlet.

Another alternative is that the cutting tool body can comprise a coolant dispensing housing mounted thereon, and an elongated cutting tool nozzle held by the coolant dispensing housing. In such case, the cutting tool nozzle can comprise an outlet end formed with the coolant outlet.

The coolant outlet can comprise first and second extremities and an elongated intermediate portion extending therebetween. The medial line can extend between midpoints of the first and second extremities. The medial line, when extending between the first and second extremities is other than a straight line. It will be understood that the medial line, as well as planes and axes mentioned in the description and claims, refer to imaginary lines and axes. A medial line of an elongated coolant outlet can be determined by measuring points which are an equal distance from opposing longitudinal edges of the outlet.

The bend can have a V-shape or U-shape. One or more portions of the medial line can be straight. The entire medial line can be curved. In the latter case, the bend can be constituted by at least a portion of the curve.

The coolant outlet is defined by a peripheral edge. The peripheral edge can be formed in an outlet end of the cutting tool, coolant dispensing housing or nozzle. The peripheral edge can comprise at least one curved edge. The peripheral edge can comprise only curved edges. Stated differently, the peripheral edge can have a non-polygonal shape. The peripheral edge of the coolant outlet can have a closed shape. Stated differently, the coolant outlet can be defined within a continuous edge.

In accordance with another aspect of the subject matter of the present application, there is provided a cutting tool nozzle for dispensing coolant having a coolant outlet with any of the features of the first aspect.

The cutting tool nozzle can further comprise inlet and outlet ends and a coolant channel extending from the inlet end to the outlet end. The coolant channel can comprise a coolant inlet formed at the inlet end thereof and the coolant outlet formed at the outlet end thereof.

In accordance with yet another aspect of the subject matter of the present application, there is provided a cutting tool coolant delivery system comprising a coolant dispensing housing and a cutting tool nozzle held thereby and formed with a coolant outlet, the coolant outlet having any of the features of the first aspect.

In accordance with any of the aspects above the cutting tool can comprise a cutting element having a cutting edge. Curvature of the bend can be configured to correspond to curvature of the cutting edge of a cutting element. At least the bend of the medial line can be configured to correspond to curvature of a cutting edge by forming the shape of the outlet such that a resulting bend thereof corresponds to a projection of the cutting edge. The cutting element can be a cutting insert.

In accordance with another aspect of the subject matter of the present application, a cutting tool, coolant delivery system or cutting tool nozzle, can have a plurality of elongated coolant outlets. For example, one of the coolant outlets can have an elongated shape having a medial line comprising a bend, and a second coolant outlet can have an elongated shape, or at least two coolant outlets can have elongated shapes.

The coolant outlets can have any of the features mentioned in connection with other aspects or described hereinbelow.

The cutting tool can have at least one coolant outlet directed at a cutting edge, across a first face of a cutting element, and at least one coolant outlet directed at the cutting edge across a second face of a cutting element. The first face can be a rake surface. The first face can be perpendicular to the second face of the cutting element. The second face can be a relief surface. The at least one coolant outlet directed to the first face can have an elongated shape with a medial line comprising a bend and the at least one coolant outlet directed to the second face can have an elongated linear shape, i.e. a straight elongated shape, although it can have one or more curved edges (for example, it can be oval shaped).

In accordance with any of the aspects above, a cutting tool, coolant delivery system or cutting tool nozzle can comprise only a single coolant outlet. The single coolant outlet can be configured to dispense fluid on a surface of a cutting element. The surface can be a rake surface. In a case were a cutting tool is configured to deliver coolant along two faces of a cutting element, the cutting tool can comprise an additional elongated coolant outlet configured to direct coolant at another face of a cutting element.

The cutting tool, coolant delivery system, and cutting tool nozzle according to any of the aspects above can have any of the features mentioned in connection with any other aspect or described hereinbelow.

In accordance with yet another aspect of the subject matter of the present application, there is provided a cutting tool nozzle which includes a coolant channel having a coolant channel axis C. A cross section of the coolant channel taken perpendicular to the channel axis C has an elongated curved shape with two extremities. The cross section has a periphery and a medial line A passing through the extremities. At least three circles, two outer circles and an inner circle, can be inscribed in the cross section, the center of each circle being located on the medial line A. Each outer circle touches the periphery at a respective extremity along an arc of the circle, the arc being centered on an intersection of the medial line A and the respective extremity. The inner circle touches the periphery at points on opposite sides of the medial line A and the center of the inner circle is located between the centers of the outer circles; and wherein the centers of the inscribed circles are non-collinear.

In accordance with still a further aspect of the subject matter of the present application, there is further provided a cutting tool which includes a cutting edge located in a cutting portion of the cutting tool, and a coolant delivery system, the coolant delivery system includes at least the abovementioned nozzle.

In accordance with any of the aspects above, a possible advantage of the elongated shape of the coolant outlet is that it can be configured to provide a uniform coolant supply along an elongated cutting edge of a cutting element. Such area can also include an area of engagement with a workpiece. For example, such shaped coolant outlet can be configured to provide a uniform coolant supply along a cutting edge comprising an apex and at least one elongated edge extending from the apex until a predetermined distance from the apex. The coolant supply being applied in a uniform manner from the apex until a distal end of the at least one elongated edge. Such design can possibly prolong the lifespan of the cutting element.

Another possible advantage of the elongated shape of the coolant outlet is that it can be configured to provide coolant along different shaped elongated cutting edges (for example a cutting edge comprising an apex having two lateral edges extending therefrom and forming a first angle therebetween, and a second cutting edge where the lateral edges form a different angle therebetween). Thus, a single shape of the outlet opening can be used for cooling of more than one shaped cutting edge.

Yet another possible advantage of the elongated shape comprising a medial line with a bend is that the cutting tool can comprise only a single outlet opening. Such construction can allow the outlet area to be devoid of a spaced support area between adjacent openings to avoid cracking between the openings. Possible advantages of such construction can be:
 the provision of a compact cutting tool for a given coolant supply rate; and
 a production process in which only one coolant outlet needs to be formed.

Still another possible advantage of an elongated shape comprising a bend is that such shape is configured to direct coolant only to a cutting edge of a cutting element, for example a part of a cutting element spaced from a cutting edge thereof. Consequently, less coolant can possibly be used than would otherwise be the case.

It will be understood that an alternative way of defining the feature of a coolant outlet formed with an elongated shape, wherein a medial line extending longitudinally along the coolant outlet comprises a bend, can be that the coolant outlet comprises an elongated shape, at least a part of the elongated shape being formed with a bent path or bend portion. Yet another way to define such feature is that the coolant outlet comprises an elongated shape with first and second extremities and elongated opposing edges extending therebetween, the elongated opposing edges comprising at least one bend.

BRIEF DESCRIPTION OF THE DRAWINGS

For a better understanding of the subject matter of the present application, and to show how the same may be carried out in practice, reference will now be made to the accompanying drawings, in which.

Figure 1:
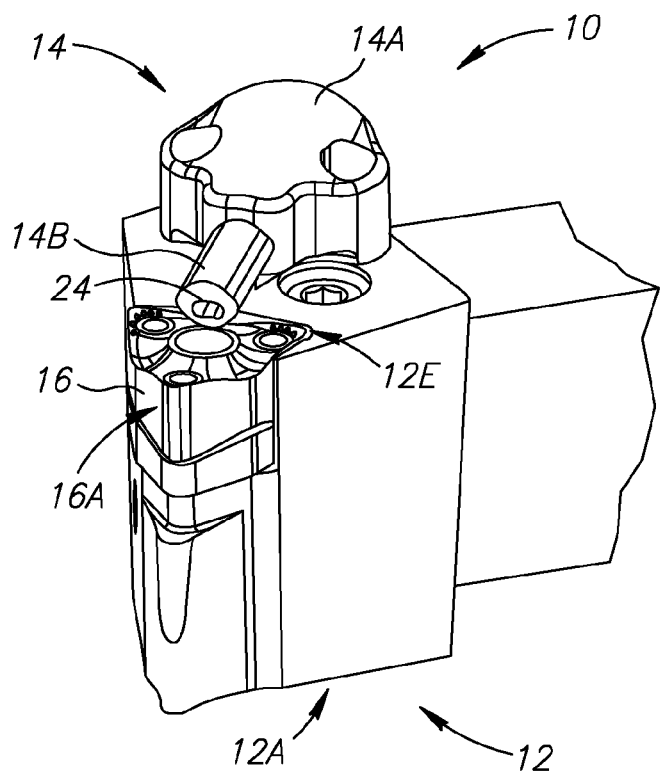
FIG. 1 is a top isometric view of a portion of a cutting tool.

Where considered appropriate, reference numerals may be repeated among the figures to indicate corresponding or analogous elements.

DETAILED DESCRIPTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific details presented herein. Reference is made to FIGS. 1 to 4, showing a cutting tool 10. The cutting tool 10 in this example is a cutting tool configured for turning and comprises a cutting tool body 12, a coolant delivery system 14, and can comprise a cutting insert 16.

The cutting tool body 12 can comprise a cutting section 12A and a shank section 12B extending therefrom.

The cutting section 12A can be formed with a coolant channel 12A1 (FIG. 4) for providing coolant to the coolant delivery system 14, and can comprise a cutting insert mounting portion 12C and a housing mounting portion 12D.

The cutting insert mounting portion 12C can be formed with an insert pocket 12E to which the cutting insert 16 can be secured.

The coolant delivery system 14 can comprise a coolant dispensing housing 14A and a cutting tool nozzle 14B mounted to the coolant dispensing housing 14A and configured to dispense coolant (not shown) therefrom.

Figure 4:
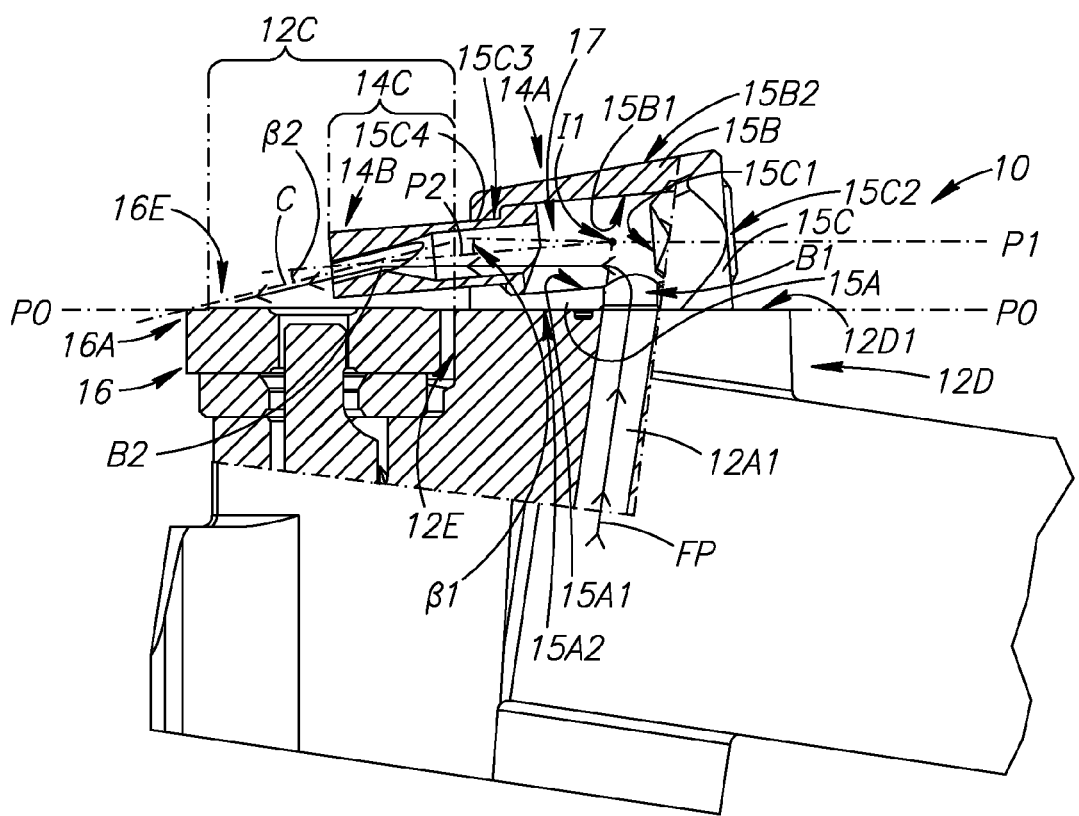
FIG. 4 is a side view of the portion of the cutting tool in FIGS. 1 to 3, including a partial cross section taken along line IV-IV in FIG. 3.

Referring now to FIG. 4 only, the coolant dispensing housing 14A can be secured to the housing mounting portion 12D. The coolant dispensing housing 14A can have a base wall 15A, an upper wall 15B and a peripheral wall 15C extending therebetween, each of which comprises respective internal and external housing surfaces (15A1, 15A2, 15B1, 15B2, 15C1, 15C2).

The external housing surface 15A2 of the base wall 15A, and an upper surface 12D1 can both meet along an intersection plane P0.

The peripheral wall 15C can be formed with a cutting tool nozzle mounting aperture 15C3, to which the cutting tool nozzle 14B can be mounted, and a shoulder stopping portion 15C4 extending inwardly from the base and upper walls (15A, 15B).

The internal housing surfaces (15A1, 15B1, 15C1) can define a housing chamber 17 therein.

A first plane P1, spaced from and parallel with intersection plane P0, can extend through the middle of the coolant dispensing housing 14A.

The base wall internal nozzle surface 15A1 and/or the upper wall internal nozzle surface (15B1) can be slanted relative to the first plane P1, and can form an acute angle β1 therewith. The purpose of which will be explained hereinbelow.

When the cutting tool 10 is held in an upright orientation as shown in FIG. 4, at least a portion 14C of the cutting tool nozzle 14B can be disposed above the insert pocket 12E. In this example the cutting tool nozzle 14B can be disposed above a surface 16E of the cutting insert 16 which is a rake surface.

The cutting insert 16 comprises a cutting edge 16A, i.e. an edge configured to engage a workpiece (not shown) when mounted to the cutting tool body 12 as shown.

Figure 2:
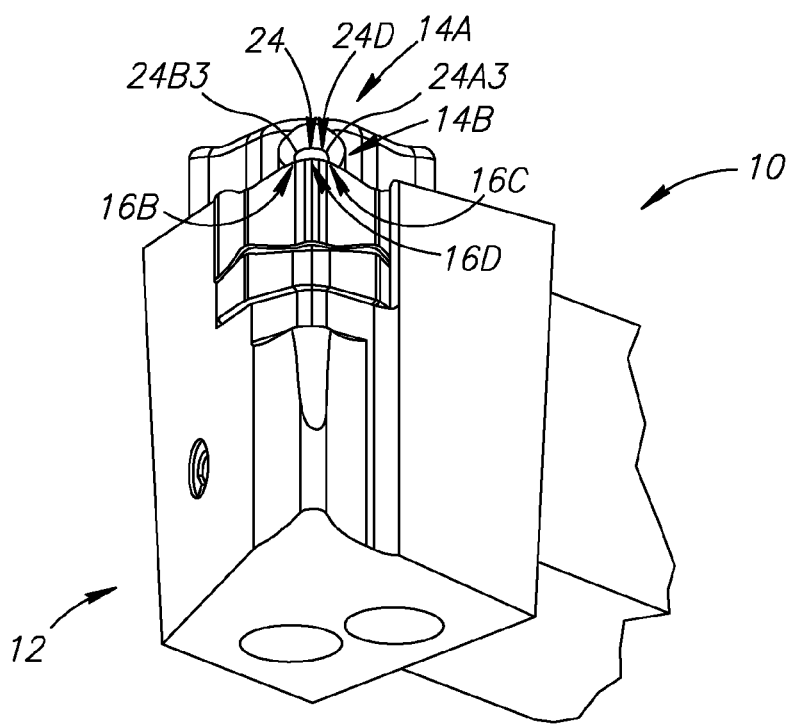
FIG. 2 is a bottom isometric view of the portion of the cutting tool shown in FIG. 1.
Figure 3:
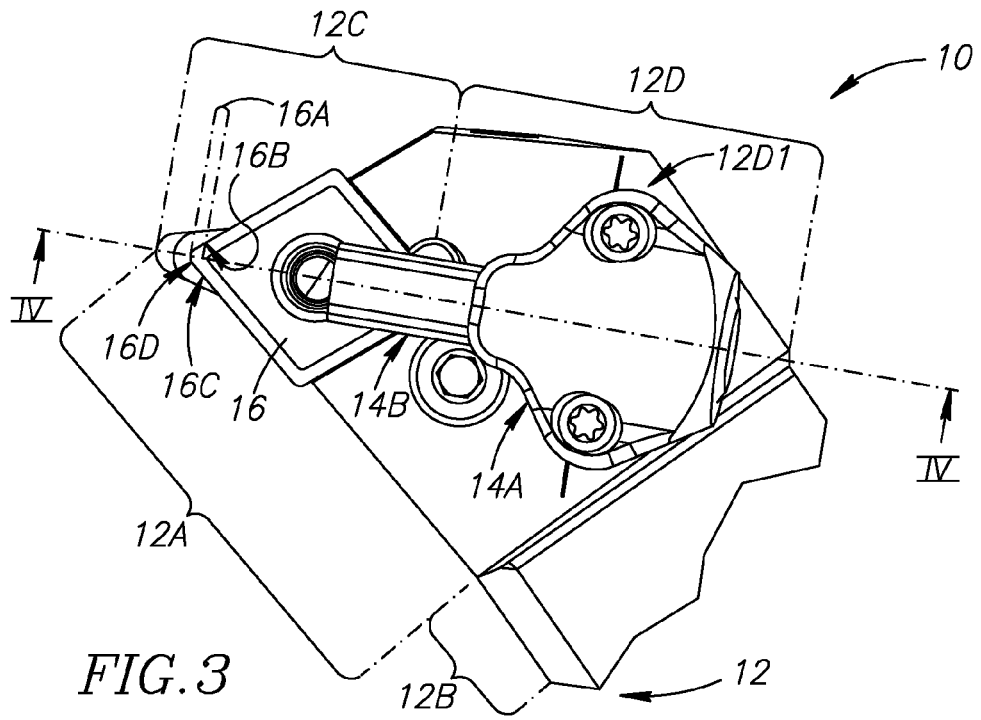
FIG. 3 is a top view of the portion of the cutting tool in FIGS. 1 and 2.

Referring now to FIG. 3, the cutting edge 16A can have first and second cutting edge side surfaces (16B,16C) meeting at an apex 16D. Similarly, the curved cutting edge 16A is seen from a different view in FIG. 2.

Figure 5:
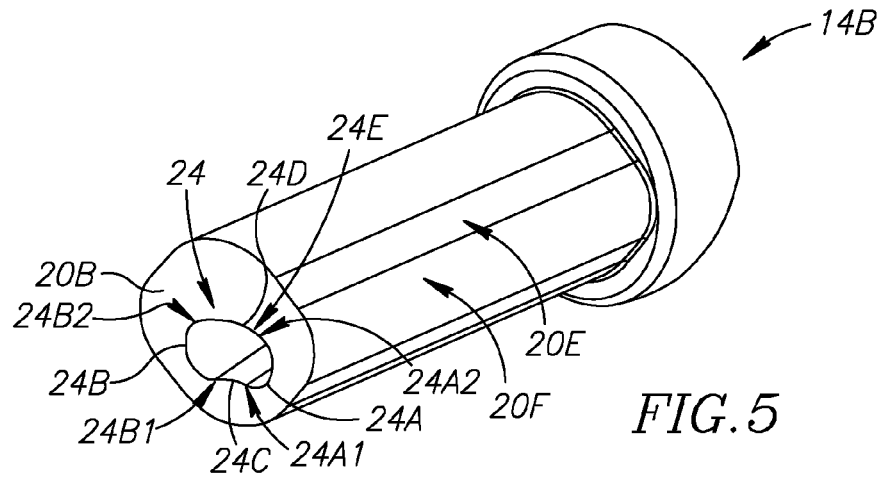
FIG. 5 is an isometric view of a cutting tool nozzle of the cutting tool in FIGS. 1 to 4.
Figure 6:
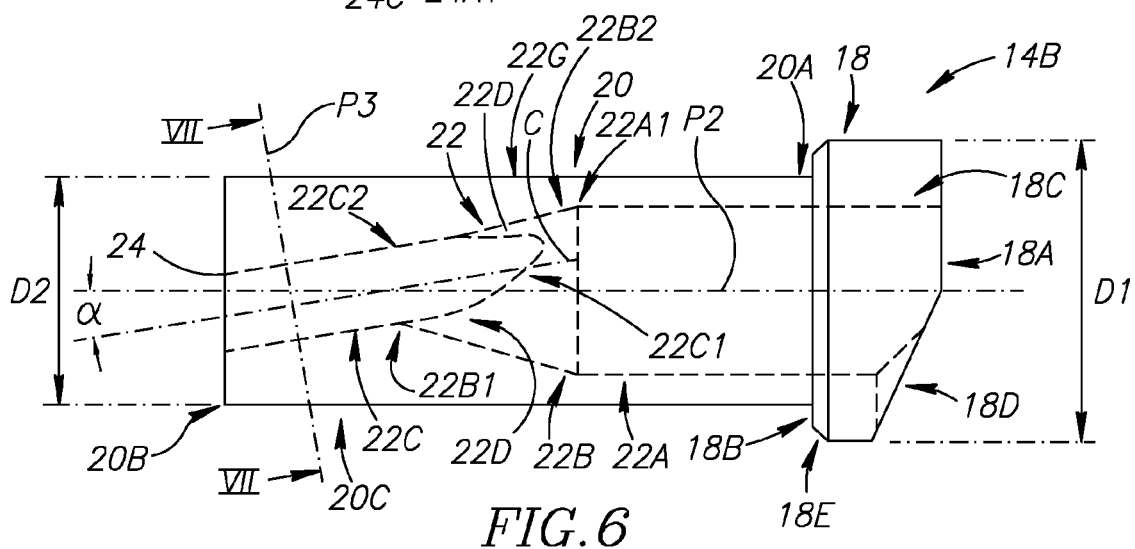
FIG. 6 is a schematic side view of the cutting tool nozzle in FIGS. 1 to 5.

Attention is drawn to FIGS. 5 and 6. The cutting tool nozzle 14B can comprise an elongated shape. The nozzle 14B can have a first nozzle tube section 18 and a second nozzle tube section 20 extending therefrom.

The first nozzle tube section 18 can have a cylindrical shape with a diameter Dl, and can comprise a first tube inlet end 18A, a first tube front end 18B, and a first tube section peripheral wall 18C extending therebetween.

The first nozzle tube section 18 can be formed with a first tube section slanted notch 18D extending from the first tube section inlet end 18A to the first tube section peripheral wall 18C.

The first tube section front end 18B can be formed with a first tube section tapered edge 18E which decreases in diameter in a direction away from the first tube section inlet end 18A.

The second nozzle tube section 20 can have a cylindrical shape with a diameter D2, and can comprise a second tube section rear end 20A, a second tube section outlet end 20B, and a second tube section peripheral wall 20C extending therebetween.

Figure 7:
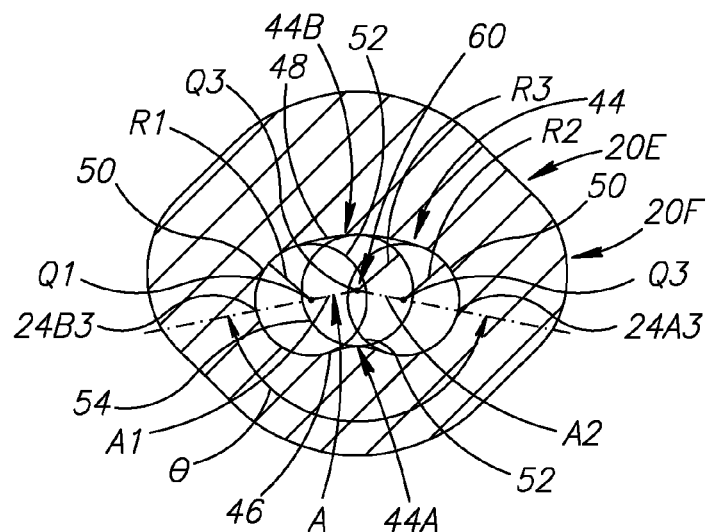
FIG. 7 is a schematic cross section taken along line VII-VII in FIG. 6.

As best seen in FIG. 7, the second tube section peripheral wall 20C may not be circular and can have straight sections 20E disposed between round sections 20F.

The second nozzle tube section 20 can have a middle portion 20G equally spaced from the second tube section rear end 20A and the second tube section outlet end 20B.

The diameter D1 is greater than the diameter D2, therefore when the cutting tool nozzle 14B is mounted on the coolant dispensing housing 14A, the cutting tool nozzle 14B can slide rearwardly into the coolant dispensing housing 14A, for example if impacted by a chip or workpiece, and can telescopically project forward when coolant flows along flow path FP, such forward motion being arrested by engagement of the first tube section tapered edge 18E with the shoulder stopping portion 15C4. Another possible advantage of such construction can be that it allows for ease of insertion and removal of the cutting insert 16 to the cutting tool body 12, when the cutting tool nozzle 14B is partially retracted into the coolant dispensing housing 14A.

A longitudinal nozzle plane P2 can extend through the middle of the cutting tool nozzle 14B. The plane P2 can intersect plane P1 along an intersection line I1 and be slanted relative thereto.

The cutting tool nozzle 14B is formed with a coolant channel 22 extending from the first tube section inlet end 18A to the second tube section outlet end 20B. The coolant channel 22 can comprise first, second and third sub-channels (22A, 22B, 22C).

The first sub-channel 22A can have a cylindrical shape and can extend from the inlet end 18A to a first sub-channel end portion 22A1. The first sub-channel end portion 22A1 can be disposed in the second nozzle tube section 20. The first sub-channel end portion 22A1 can be disposed adjacent to the middle portion 20G of the second nozzle tube section 20, closer to the second tube section rear end 20A than the second tube section outlet end 20B.

The second sub-channel 22B can have a frustoconical shape and can extend from the first sub-channel end portion 22A1 to a second sub-channel end portion 22B1, with a second sub-channel peripheral surface 22B2 extending therebetween. The second sub-channel 22B can decrease in diameter in a direction away from the first tube section inlet end 18A.

The third sub-channel 22C can extend from a third sub-channel rear portion 22C1 to the second tube section outlet end 20B, and can comprise a third sub-channel peripheral surface 22C2.

The third sub-channel rear portion 22C1 can, along the length thereof, extend in a linear manner into the second sub-channel 22B from the second sub-channel end portion 22B1. The third sub-channel rear portion 22C1 is shown in FIG. 6 extending to a part of the second sub-channel 22B disposed between the first sub-channel end portion 22A1 and second sub-channel end portion 22B1, since a dimension of the third sub-channel 22C, which is parallel with longitudinal nozzle plane P2, has a greater magnitude than a parallel dimension of the second sub-channel 22B. The cutting tool 10 can comprise lateral wall edges 22D which project into the coolant channel (22). The lateral wall edges 22D can be disposed between the second sub-channel peripheral surface 22B2 and the third sub-channel peripheral surface 22C2.

A longitudinal third sub-channel axis C, which passes through a midpoint of the third sub-channel 22C, can form an acute angle α with the nozzle plane P2.

Referring now to FIGS. 4 and 6, it can be seen that the cutting tool can be formed with a flow path FP extending from the cutting section 12A coolant channel 12A1 to the cutting edge 16A, via the coolant delivery system 14, for dispensing coolant (not shown) thereon.

The flow path FP enters the housing chamber 17 in a direction parallel with the coolant channel 12A1 and perpendicular to the base wall external nozzle surface 15A2. The slant of the base wall internal nozzle surface 15A1 and/or the upper wall internal nozzle surface (15B1) can direct the flow path FP to bend (B1) and extend in a direction parallel with nozzle plane P2. The flow path FP can bend (B2) again when entering the third sub-channel rear portion 22C1 to extend in a direction parallel with third sub-channel axis C.

It will be appreciated that each bending of the flow path FP can be advantageous in that it can allow coolant to be directed at a cutting edge of the cutting tool from a proximate coolant outlet. Such bending can allow an efficient focused flow of coolant to reach the cutting edge. Such bending can also allow a compact cutting tool to be utilized. It is noted that such bending can allow a desired flow rate angle (which in this example is shown by angle α) to be within a range of 10° to 25°. Such angle can provide more efficient cooling of the cutting edge than other angles, for example by lubricating the edge to allow chips to slide therealong.

With reference to FIG. 5, the third sub-channel 22C is shown to comprise a coolant outlet 24 formed in the second tube section outlet end 20B. The coolant outlet 24 is formed with an elongated shape comprising a bend 24E. The coolant outlet 24 can be formed with a continuous edge. Stated differently, the coolant outlet is disposed at an internal portion of the second tube section outlet end 20B and not along a peripheral portion thereof The coolant outlet 24 comprises extremities constituted by concave-shaped side edges (24A,24B) each having first and second end points (24A1, 24A2, 24B1, 24B2), a lower convex-shaped edge 24C extending between the first end points (24A1, 24B1) of the concave-shaped side edges (24A,24B), and an upper concave-shaped edge 24D extending between the second end points (24A2, 24B2) of the concave-shaped side edges (24A,24B).

With reference to FIG. 7, it will be understood that the coolant outlet 24 has an elongated shape since a dimension of the coolant outlet 24 extending between midpoints (24A3, 24B3, FIG. 7) of the concave-shaped side edges (24A, 24B) along a medial line A, is greater than a dimension perpendicular to the medial line A which extends between the lower convex-shaped edge 24C and upper concave-shaped edge 24D. It is noted that, the cross sectional shape of the coolant channel 22 shown in FIG. 7 is identical to the shape of the coolant outlet 24. The view of the cross section, and hence the description given with respect to FIG. 7 corresponds to a description of the coolant outlet 24.

The coolant outlet 24 is asymmetric about a plane extending between midpoints (24A3, 24B3) of the two extremities (24A,24B), consequently the medial line A comprises a bend 60. The bend 60 of the medial line can correspond to a bend 24E in the coolant outlet shape.

The angle θ can be 152°.

A coolant outlet can be configured with an elongated shape comprising a bend which corresponds to a cutting edge of a cutting element. For example, as best seen in FIG. 2, the elongation and curvature of the coolant outlet 24 correspond to the elongation of curvature of the cutting edge 16A. For example, it can be seen that the gradient of curvature of the upper concave-shaped edge 24D corresponds to that of the cutting edge 16A. It will be understood that the projection of the coolant outlet 24 can be slightly above the cutting edge 16A (and therefore the coolant outlet 24 can be partially seen in FIG. 2) to allow the fluid path to also be directed to an engagement area of a workpiece to be engaged by the cutting edge 16A, as well as the cutting edge 16A itself.

With reference to FIGS. 8A to 8D, further examples of coolant outlets (26A, 28A, 30A, 32A) configured to correspond to respective cutting edges (26B, 28B, 30B, 32B) are shown.

Medial lines (26C, 28C, 30C, 32C) of the coolant outlets (26A, 28A, 30A, 32A) are shown for understanding of correspondence to the cutting edges (26B, 28B, 30B, 32B). Each medial line (26C, 28C, 30C, 32C) comprises at least one bend (26C, 28G, 30D, 30E, 30F, 32F, 32G).

The elongated shapes can be U or arc-shaped 26A corresponding to a circular cutting edge 26B, a V-shaped coolant outlet 28A corresponding to a V-shaped cutting edge 28B, an M-shaped coolant outlet 30A corresponding to a M-shaped cutting edge 30B, and an S-shaped coolant outlet 32A corresponding to a S-shaped cutting edge 30B.

Figure 9:
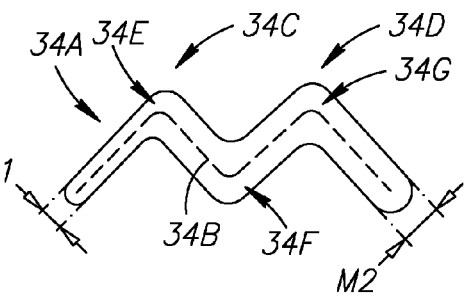
FIG. 9 is a schematic front view of another cutting tool outlet.

FIG. 9 shows another M-shaped coolant outlet 34A having a varied magnitude of dimension along the length thereof, i.e. in a direction transverse to a medial line 34B. For example, the outlet has a smaller magnitude dimension M1 at a first section thereof 34C than a magnitude of dimension M2 at a second section thereof 34D. Such design can be advantageous where a cutting tool is configured to cut materials of different harnesses, causing non-uniform heating of portions of a cutting edge of a cutting tool which require non-uniform amounts of coolant to be applied to the different portions. The medial line (34B) can have bends (34E, 34F, 34G)

It will be understood that a varied magnitude of dimension along an elongated coolant outlet can be applied to any shape in accordance with the subject matter of the present application, and not to only an M-shaped coolant outlet.

Figure 8:
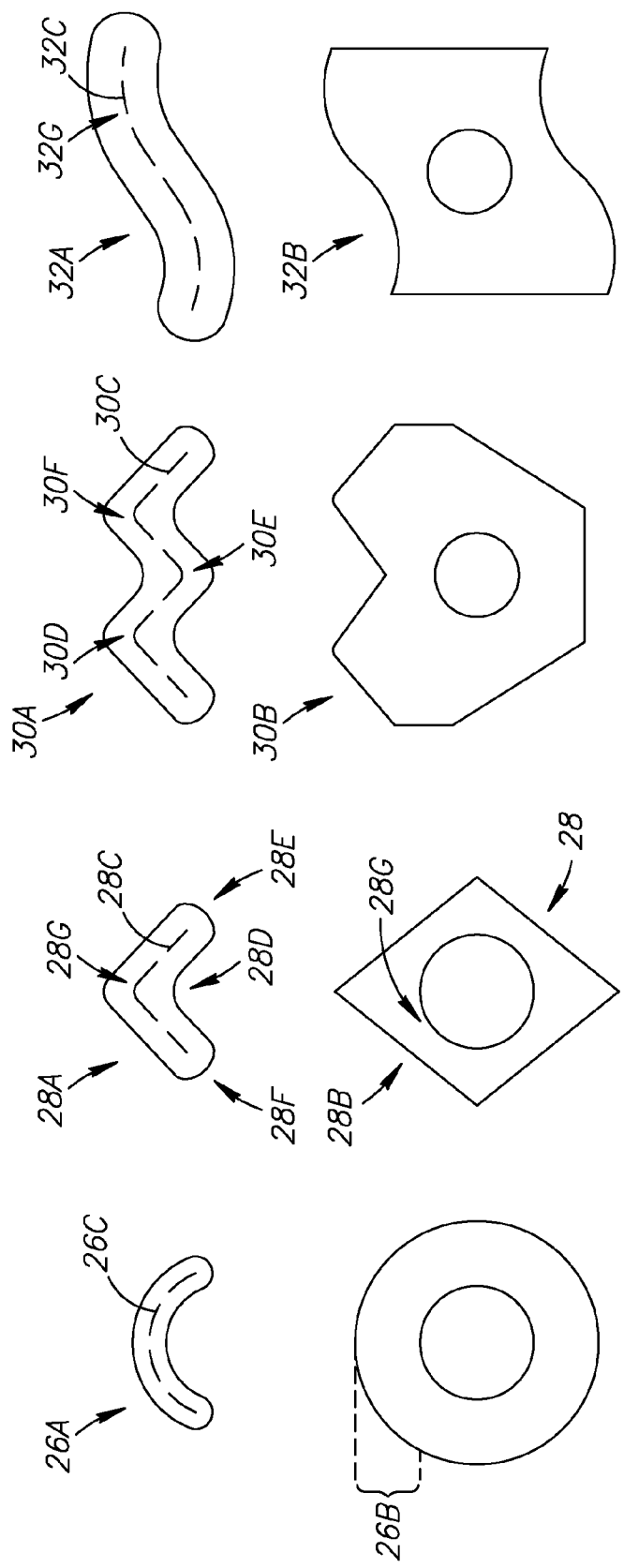
FIGS. 8A to 8D are schematic front views of cutting tool coolant outlets and cutting elements with cutting edges correspondingly in shape to the respective coolant outlets.

Reverting to FIG. 8, for the purposes of explanation only, it is noted that the curvature of the coolant outlet 28A can result in a solid surface 28D between two extremities (28E, 28F) which is part of the outlet end face in which the coolant outlet 28A is formed. It will be appreciated that if the coolant outlet 28A would be a triangular shaped void in which the two extremities (28E, 28F) were connected by a straight edge, coolant fluid would be projected also onto a portion of the cutting element 28 which is spaced from the cutting edge 28B thereof. A possible advantage of a coolant outlet in accordance with the subject matter of the present application can be that coolant fluid is not directed to portions of a cutting element which are spaced from a cutting edge thereof and are therefore less needed.

Figure 10:
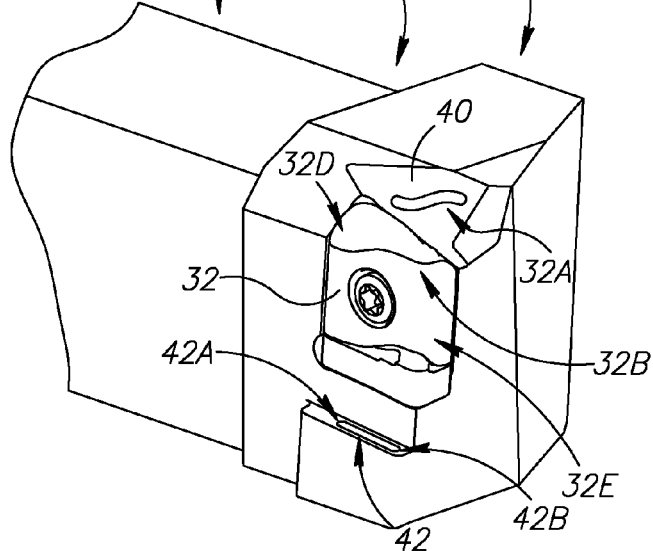
FIG. 10 is a top isometric view of another cutting tool.

Reference is made to FIG. 10, showing a cutting tool 36 comprising a cutting insert 32, and a cutting tool body 38.

The cutting tool body 38 can comprise a cutting section 38A and a shank section 38B extending therefrom.

The cutting section 36 is formed with an S-shaped coolant outlet 32A in an outlet end surface 40 thereof. The cutting section 36 can also be formed with an oval-shaped coolant outlet 42, having curved edges (42A, 42B) in an outwardly projecting portion 44 of the cutting section 38A.

The S-shaped coolant outlet 32A can be configured to dispense coolant (not shown) across a face 32D of the cutting insert 32 which can apply coolant to cutting edge 32B. The oval-shaped coolant outlet 42 can be configured to dispense coolant (not shown) across another face 32E of the cutting insert 32 which can apply coolant to cutting edge 32B. In this example, face 32D is a rake surface and face 32E is a relief surface.

It will be understood that the coolant outlets can be any appropriate shape in accordance with the subject matter of the present application.

Figure 11:
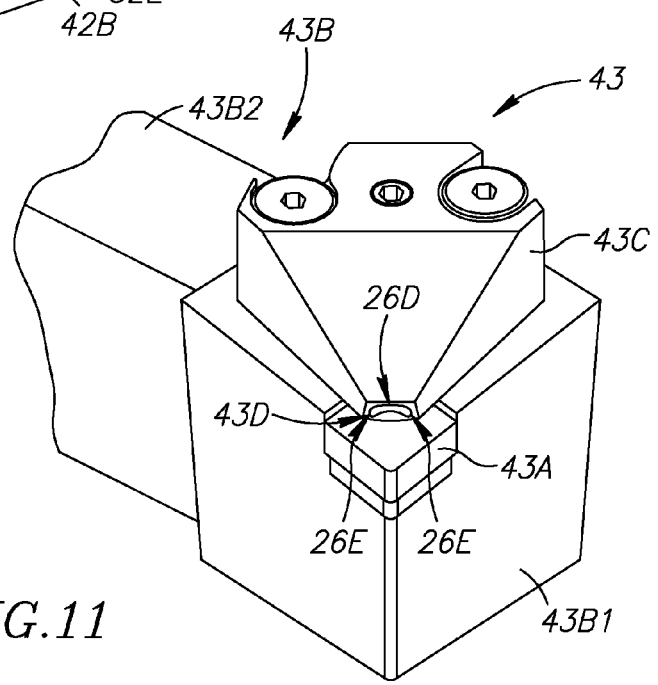
FIG. 11 is a top isometric view of a portion of yet another cutting tool.

Reference is made to FIG. 11, showing a cutting tool 43 comprising a cutting insert 43A, and a cutting tool body 43B.

The cutting tool body 43B can comprise a cutting section 43B1, a shank section 43B2, a coolant dispensing housing 43C mounted on the cutting section 43B1, and a coolant channel (not shown) extending through the cutting section 43B1 and the coolant dispensing housing 43C.

The coolant dispensing housing 43C is formed with an arc-shaped coolant outlet 26A at the end of the coolant channel in an outlet end surface 43D thereof Drawing attention to FIGS. 1 and 11, it will be understood that a bend portion of the coolant outlet can have a downward curvature. Stated differently, an apex 26D of the coolant outlet can be spaced further from a cutting section 12A than edges 26E of the coolant outlet adjacent to the apex 26D. It will be appreciated that such corresponding orientation of a coolant outlet can provide a possible advantage when configured to cool a cutting edge.

FIG. 7 shows a cross section of the coolant channel 22 taken perpendicular to the third sub-channel axis C. The cross section is taken along line VII-VII in FIG. 6 and defines a cross sectional plane P3 of the coolant channel 22. Such cross section of the coolant channel 22 has a periphery 44 and the medial line A. The periphery 44 is a non-polygonal closed shape, which can take the form of an elongated curved shape provided with two extremities 50. Each extremity 50 constitutes a concave, arcuate region of the periphery 44 outside of an inner circle 54, which inner circle is discussed further below. According to some embodiments, the periphery 44 has at least one convex section 46 and at least one concave section 48 which are located on opposite sides of the medial line A, the at least one concave section 48 being located between the two extremities 50.

At least three circles, two outer circles 52 and an inner circle 54, can be inscribed in the cross section of the coolant channel 22. The outer circles 52 can have different radiuses R1, R2. Each outer circle 52 touches the periphery 44 along an arc of that outer circle 52. The arc may be centered on an intersection (24A3, 24B3) of the medial line A and the respective extremity 50. The inner circle 54 may have a radius R3 different from the radiuses of the outer circles 52. The inner circle 54 can touch the periphery 44 on opposite sides of the medial line A. The inner circle 54 can touch the periphery 44 along an arc of the concave section 48. The inner circle 54 can touch the periphery 44 at a point 44A on the convex section 46, which point can be diametrically opposite a point 44B on the arc of the convex section 48. Point 44A can be a midpoint of the concave section 46. Point 44B can be a midpoint of the convex section 48.

A first distance between the centers Q1, Q2 of the two outer circles 52 can be greater than distances between the center Q3 of the inner circle 54 and the centers Q1, Q2 of either of the outer circles 52. A center P3 of the inner circle 54 can be located between centers P1, P2 of the outer circles 52. The centers Q1, Q2, Q3 of the three inscribed circles 52, 54 are non-collinear. The radiuses R1, R2, R3 of the three inscribed circles 52, 54 can be different from each other or they can be equal. The outer inscribed circles 52 can overlap or can be spaced from each other. Also, the inner circle 54 can be located mid-way between the extremities 50.

The angle θ can be in the range 91° to 179°.

The center Q3 of the inner circle 54 does not have to be equidistant from centers Q1 and Q2 of the outer circles 52 or from the extremities 50 at opposite ends of medial line A. Therefore the first and second medial line sections A1, A2 do not have to be equal.

As described hereinabove, there can be three inscribed circles 52, 54. The inscribed circles 52, 54 can be cross sections of holes formed in the nozzle 22 and defined in the cross sectional plane P3. The holes can be formed by drilling. In accordance with some embodiments, the holes forming the inscribed circles 52, 54 can be joined together to form the coolant channel 22 by drilling further holes between them. In accordance with some embodiments, the holes forming the inscribed circles 52, 54 can be joined together to form the coolant channel 22 by other methods.

The coolant channel 22 in the nozzle can be formed by techniques such as machining a nozzle blank or injection molding.

In accordance with some embodiments involving machining, a nozzle blank can first be provided. An initial hole then is drilled/milled, the initial hole can have a rotation axis perpendicular to the cross sectional plane P3.

The three inscribed circles can have the same size (R1=R2=R3), after the initial hole is drilled, a milling tool within the initial hole moves laterally along a first of the two medial line sections A1, A2 of the medial line A to form a first portion of the coolant channel, and then along the other of the two medial line sections to form a second portion of the coolant channel. In general, the milling is typically conducted with the mill axis being parallel to the rotation axis of the initial hole.

When the inscribed circles have different sizes, drills/mills of different diameters can be used to form at least first and second holes. After each hole is formed, or after both holes are formed, one can move a milling tool laterally from one formed hole along at least one of the medial line sections A1, A2. If two holes have already been formed, one can move the milling tool in a direction along one of the medial line sections to mill the material between the two holes. Again, the milling is typically conducted with the mill axis being parallel to the rotation axis of one or both of the two holes. It is understood that a third hole can also be formed and further associated lateral milling conducted.

The medial line A can be a projection of the cutting edge 24. The projection can be projected on the cross sectional plane P3.

It will be understood that curvature of a bend of a coolant outlet can be configured to correspond to curvature of a cutting edge by using a projection of a cutting edge to form a medial line of the coolant outlet.

While the subject matter of the present application has been described with reference to one or more specific embodiments, the description is intended to be illustrative as a whole and is not to be construed as limiting the subject matter of the present application to the embodiments shown. It is appreciated that various modifications may occur to those skilled in the art that, while not specifically shown herein, are nevertheless within the scope of the subject matter of the present application.

What is claimed is:

1. A cutting tool (10, 43) comprising:
   a cutting tool body (12, 43B) having a cutting section (12A, 43B1);
   a coolant dispensing housing (14A, 43C) mounted on the cutting section;
   a cutting element (16, 43A) secured in an insert pocket (12E) of the cutting section, the cutting element having a cutting edge and a rake surface; and
   a coolant channel (22) having a coolant outlet (24, 26A, 28A, 30A, 32A, 34A) formed with an elongated shape configured to dispense fluid on the rake surface, wherein:
   a medial line (A, 26C, 28C, 30C, 32C, 34C) extending longitudinally along the coolant outlet (24, 26A, 28A, 30A, 32A, 34A) comprises a bend (60, 26C, 28G, 30D, 30E, 30F, 32F, 32G); and
   curvature of the bend is configured to correspond to curvature of the cutting edge.

2. The cutting tool (43) according to claim 1, wherein the coolant dispensing housing (43C) comprises an outlet end surface (43D) formed with the coolant outlet (26A).

3. The cutting tool (10) according to claim 1, further comprising an elongated cutting tool nozzle (14B) held by the coolant dispensing housing (14A); the cutting tool nozzle (14B) comprising an outlet end (20B) formed with the coolant outlet (24).

4. The cutting tool (10, 36, 43) according to claim 1, wherein an apex (26D) of the coolant outlet (26A) is spaced further from an operative cutting edge of the cutting section (43B1) than edges (26E) of the coolant outlet (26A) adjacent to the apex (26D).

5. The cutting tool (10, 43) according to claim 1, wherein the medial line (A) coolant outlet (24) is configured to correspond to curvature of the cutting edge (16A) in that a projection of the cutting edge (16A) corresponds in shape to at least the bend (60) of the medial line (A).

6. The cutting tool (10, 43) according to claim 1, wherein the cutting tool (34) further comprises an additional coolant outlet (42) having an elongated shape.

7. The cutting tool (10, 43) according to claim 1, wherein the cutting tool (10) comprises only a single coolant outlet (24).

8. The cutting tool (10, 43) according to claim 1, wherein a flow path (FP) through the coolant channel (22) comprises at least one bend (B1, B2).

9. The cutting tool (10, 43) according to claim 1, wherein the cutting tool (10) comprises lateral wall edges (22D) projecting into the coolant channel (22).

10. The cutting tool (10, 43) according to claim 1, wherein the coolant outlet (24) comprises concave-shaped side edges (24A,24B) each having first and second end points (24A1, 24A2, 24B1, 24B2), a lower convex-shaped edge (24C) extending between the first end points (24A1, 24B1) of the concave-shaped side edges (24A,24B), and an upper concave-shaped edge (24D) extending between the second end points (24A2, 24B2) of the concave-shaped side edges (24A, 24B).

11. The cutting tool (10, 43) according to claim 1, wherein the shape of the coolant outlet (24) is selected from the group including an arc-shape (26A), a V-shape (28A), an M-shape (30A), or an S-shape (32A).

12. The cutting tool (10, 43) according to claim 1, wherein the coolant outlet (24) comprises at least one curved edge (24A, 24B, 24C, 24D).

13. The cutting tool (10, 43) according to claim 11, wherein the coolant outlet (24) comprises only curved edges (24A, 24B, 24C, 24D).

14. A cutting tool (10, 43) comprising:
a cutting tool body (12, 43B) having a cutting section (12A, 43B1);
a coolant dispensing housing (14A, 43C) mounted on the cutting section;
a cutting element (16, 43A) secured in an insert pocket (12E) of the cutting section, the cutting element having a cutting edge; and
a coolant channel (22) having a coolant outlet (24, 26A, 28A, 30A, 32A, 34A) formed with an elongated shape, wherein:
a medial line (A, 26C, 28C, 30C, 32C, 34C) extending longitudinally along the coolant outlet (24, 26A, 28A, 30A, 32A, 34A) comprises a bend (60, 26C, 28G, 30D, 30E, 30F, 32F, 32G); and
curvature of the bend is configured to correspond to curvature of the cutting edge, wherein, in a direction transverse to the medial line, a dimension of the coolant outlet (34A) has varying magnitude (M1, M2).

15. The cutting tool (10, 43) according to claim 1, wherein the coolant outlet (24, 26A, 28A, 30A, 32A, 34A) is defined within a continuous edge.

16. A cutting tool comprising:
a cutting tool body having a cutting section provided with an internal coolant channel having a coolant outlet; and
a cutting element secured in an insert pocket of the cutting section, the cutting element having a cutting edge; wherein:
the coolant outlet has an elongated shape;
a medial line extending longitudinally along the coolant outlet comprises a bend;
curvature of the bend is configured to correspond to curvature of the cutting edge; and
the coolant outlet and the cutting element are arranged such that coolant fluid, after exiting the coolant outlet, retains the elongated shape of the coolant outlet as it travels in a direction of the cutting edge.

17. A cutting tool (10, 36, 43) comprising:
a cutting tool body (12, 43B) having a cutting section (12, 43B1) including an operative cutting edge (16A, 32B) and a rake surface (32D);
a coolant channel (22) having a coolant outlet (24, 26A, 28A, 30A, 32A, 34A) formed with an elongated shape configured to dispense fluid on the rake surface, the coolant outlet having an apex (26D) and outlet edges (26A) on either side of the apex, at opposite ends of the elongated shape; and
a medial line (A, 26C, 28C, 30C, 32C, 34C) extending longitudinally along the coolant outlet (24, 26A, 28A, 30A, 32A, 34A) comprises a bend (60, 26C, 28G, 30D, 30E, 30F, 32F, 32G); wherein:
the apex (26D) of the coolant outlet (26A) is spaced further from the operative cutting edge than both of the outlet edges (26E).

* * * * *